US010883848B2

(12) United States Patent
Dal Bo et al.

(10) Patent No.: US 10,883,848 B2
(45) Date of Patent: Jan. 5, 2021

(54) METHODS AND SYSTEMS FOR PROVIDING AN IMPROVED MANEUVER COUNTDOWN BAR

(71) Applicant: HERE GLOBAL B.V., Eindhoven (NL)

(72) Inventors: Laura Dal Bo, Berlin (DE); Jens Lembke, Fürstenberg (DE); Jörg Lemme, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 173 days.

(21) Appl. No.: 16/136,747

(22) Filed: Sep. 20, 2018

(65) Prior Publication Data

US 2020/0096358 A1 Mar. 26, 2020

(51) Int. Cl.
*G01C 21/36* (2006.01)
*G06Q 30/02* (2012.01)

(52) U.S. Cl.
CPC ..... *G01C 21/3655* (2013.01); *G01C 21/3632* (2013.01); *G01C 21/3664* (2013.01); *G01C 21/3697* (2013.01); *G06Q 30/0266* (2013.01)

(58) Field of Classification Search
None
See application file for complete search history.

(56) References Cited

U.S. PATENT DOCUMENTS

| 5,951,621 | A | 9/1999 | Palalau et al. | |
|---|---|---|---|---|
| 6,285,950 | B1 * | 9/2001 | Tanimoto | G01C 21/34 340/994 |
| 6,363,322 | B1 | 3/2002 | Millington | |
| 6,611,753 | B1 | 8/2003 | Millington | |
| 7,925,438 | B2 | 4/2011 | Lo | |
| 8,073,621 | B2 * | 12/2011 | Kim | G08G 1/096844 701/468 |

(Continued)

FOREIGN PATENT DOCUMENTS

EP 1 482 279 A2 12/2004

OTHER PUBLICATIONS

Llaneras, R. E. et al., *In-Vehicle Navigation Systems: Interface Characteristics and Industry Trends*, Proceedings of the Second International Driving Symposium on Human Factors in Drive Assessment, Training and Vehicle Design, (Jan. 2003) pp. 52-58.

*Primary Examiner* — Abdhesh K Jha
(74) *Attorney, Agent, or Firm* — Alston & Bird LLP (57) ABSTRACT

A method, system, and computer program product are provided for providing navigation assistance through an improved countdown bar in a user interface of a mapping application. In an example embodiment, the method may include obtaining a list of maneuvers for navigation to a destination location on the route. The list of maneuvers may include at least an upcoming maneuver and a following maneuver. The method may further include displaying by a display unit, at least the upcoming maneuver and the following maneuver and a countdown bar such that the display of the countdown bar is integrated with the display of the upcoming maneuver. The countdown bar may indicate a distance of travel between a current location and an intermediate location corresponding to the upcoming maneuver. The method may further include dynamically updating the display unit based on the distance of travel between the current location and the intermediate location.

17 Claims, 10 Drawing Sheets

(56) References Cited

U.S. PATENT DOCUMENTS

| | | | | |
|---|---|---|---|---|
| 9,170,122 | B2* | 10/2015 | Moore | G01S 19/42 |
| 9,243,921 | B2 | 1/2016 | Faaborg et al. | |
| 9,273,980 | B2* | 3/2016 | Carlhian | G01C 21/3632 |
| 9,310,218 | B2* | 4/2016 | Choi | G01C 21/3679 |
| 9,638,528 | B2* | 5/2017 | Shan | G01C 21/26 |
| 9,857,193 | B2* | 1/2018 | Vulcano | G01C 21/265 |
| 2005/0261825 | A1* | 11/2005 | Nix | G01C 21/3632 |
| | | | | 701/410 |
| 2005/0273252 | A1* | 12/2005 | Nix | G01C 21/3632 |
| | | | | 701/431 |
| 2008/0208450 | A1* | 8/2008 | Katzer | G01C 21/3635 |
| | | | | 701/533 |
| 2009/0112462 | A1* | 4/2009 | Lo | G01C 21/34 |
| | | | | 701/533 |
| 2012/0303274 | A1* | 11/2012 | Su | G01C 21/3632 |
| | | | | 701/533 |
| 2013/0191020 | A1* | 7/2013 | Emani | G01C 21/3492 |
| | | | | 701/468 |
| 2014/0095066 | A1* | 4/2014 | Bouillet | G08G 1/123 |
| | | | | 701/465 |
| 2014/0358438 | A1* | 12/2014 | Cerny | G01C 21/00 |
| | | | | 701/537 |
| 2015/0066360 | A1* | 3/2015 | Kirsch | G01C 21/3688 |
| | | | | 701/438 |
| 2017/0160090 | A1* | 6/2017 | Waltermann | G01C 21/34 |
| 2017/0313326 | A1 | 11/2017 | Sweeney et al. | |

* cited by examiner

METHODS AND SYSTEMS FOR PROVIDING AN IMPROVED MANEUVER COUNTDOWN BAR

TECHNOLOGICAL FIELD

The present disclosure generally relates to providing navigation assistance in a mapping application, and more particularly relates to providing an improved maneuver countdown bar in the user interface of a navigation application.

BACKGROUND

Various navigation applications are available to provide assistance, for example directions, for driving, walking, or other modes of travel. Web-based and mobile app-based systems offer navigation applications that allow a user to request directions from one point to another. Navigation devices based on Global Positioning System (GPS) technology have become common, and these systems are often used to provide directions to drivers, pedestrians, cyclists, and the like. Directions typically take the form of a list of maneuvers, where each of the maneuvers describes a turn to be made (or not to be made) at an intersection. However, quite often, directions may be difficult to follow. Especially, in the context of navigation assistance for drivers of vehicles, it is important that the assistance is provided in a manner that the driver doesn't get distracted from the road while following the assistance. For example, currently navigation applications offer direction assistance in a manner that might require the driver of the vehicle to confirm the progress of a maneuver by looking into a display interface and manually anticipate the distance or time before undertaking the next maneuver. Further the direction assistance might be provided in the form of text instructions displayed on the display interface to say, "turn right on X-Street." However, it might be difficult for the driver to identify X-Street, as the street sign might be missing, or the intersection might be confusing (e.g., if several roads intersect a traveler's current road very near to each other).

Moreover, while driving, drivers can merely peek for a second or two into the display interface of the navigation application to anticipate the distance or time before undertaking the next maneuver. Currently, navigation applications provide a plethora of information on a user interface and it might be difficult for a driver to focus only on the relevant information within such a short time span, thereby leading to inaccurate navigation assistance. In some scenarios, this may not be a practical approach for providing navigation assistance. Accordingly, there is a need for providing navigation assistance to travelers in an intuitive and ordered manner.

BRIEF SUMMARY

A method, system, and computer program product are provided in accordance with an example embodiment described herein for providing navigation assistance through an improved countdown bar in a user interface of a mapping application. The mapping application may include navigation data of a route between a source location and a destination location. The navigation data includes for example a list of maneuvers to be taken to reach the destination location from the source location. The route may be an outdoor route between two locations within a geographic area or an indoor route between two locations within the premises of a venue.

In some example embodiments, a method may be provided for displaying navigation information of a route. The method may include: obtaining a list of maneuvers for navigation to a destination location on the route, wherein the list of maneuvers comprises at least an upcoming maneuver and a following maneuver; displaying by a display unit, at least the upcoming maneuver and the following maneuver and a countdown bar such that the display of the countdown bar is integrated with the display of the upcoming maneuver, wherein the countdown bar indicates a distance of travel between a current location and an intermediate location corresponding to the upcoming maneuver; and dynamically updating the display unit based on the distance of travel between the current location and the intermediate location to display the navigation information.

Some example embodiments disclosed herein may provide a system comprising at least one display unit, at least one memory configured to store instructions, and at least one processor. The at least one processor may be configured to execute the stored instructions to obtain a list of maneuvers for navigation to a destination location on the route, wherein the list of maneuvers comprises at least an upcoming maneuver and a following maneuver; control the display unit to display at least the upcoming maneuver and the following maneuver and a countdown bar such that the display of the countdown bar is integrated with the display of the upcoming maneuver, wherein the countdown bar indicates a distance of travel between a current location and an intermediate location corresponding to the upcoming maneuver; and dynamically update the display unit, based on the distance of travel between the current location and the intermediate location to display the navigation information.

Some example embodiments disclosed herein may provide a computer program product including at least one non-transitory computer-readable storage medium having computer-executable program code instructions stored thereon. The computer-executable program code instructions when executed by a computer, cause the computer to carry out operations for displaying navigation information of a route, the operations comprising: obtaining a list of maneuvers for navigation to a destination location on the route, wherein the list of maneuvers comprises at least an upcoming maneuver and a following maneuver; displaying by a display unit, at least the upcoming maneuver and the following maneuver and a countdown bar such that the display of the countdown bar is integrated with the display of the upcoming maneuver, wherein the countdown bar indicates a distance of travel between a current location and an intermediate location corresponding to the upcoming maneuver; and dynamically updating the display unit, based on the distance of travel between the current location and the intermediate location to display the navigation information.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

DEFINITIONS

The term "link" may be used to refer to any connecting pathway including but not limited to a roadway, a highway, a freeway, an expressway, a lane, a street path, a road, an alley, a controlled access roadway, a free access roadway and the like.

The term "route" may be used to refer to a path from a source location to a destination location on any link.

The term "list of maneuvers" may be used to refer to a movement or a series of moves, steps, or turns to be taken along the route.

The term "upcoming maneuver" may exemplarily be used to refer to a maneuver that is being taken or will be taken at the instance of traversing the route. The term "following maneuver" may exemplarily be used to refer to the maneuver temporally succeeding the upcoming maneuver in the list of maneuvers.

The term "countdown bar" may exemplarily be used to refer to a counter that indicates progress of the upcoming maneuver.

The term "current location" may be used to refer to a location of the user at the time of undertaking the upcoming maneuver. The term "intermediate location" may be used to refer to a location on the route, corresponding to completion of the upcoming maneuver.

A method, apparatus, and computer program product are provided herein in accordance with an example embodiment for displaying navigation information of a route to a destination location. In some example embodiments, the methods and systems provided herein may also be used for navigating a user to the destination location. In some example embodiments, the methods and systems provided herein may also be used for displaying additional information associated with the route, and/or a point of interest on or within vicinity of the route. Such additional information may be of interest to the user. For example, the additional information may correspond to one or more of static objects on road, road blockages, diversion signs, accident spots, infrastructural components, lane dividers and the like. In some example embodiments, the point of interest may be a gas station, a coffee shop, a restaurant, a shopping complex, multiplex and the like. In some example embodiments the additional information may indicate an offering or advertisement associated with the point of interest.

In some example embodiments, the list of maneuvers may include a turn by turn series of moves to reach the destination location or a continuous graphical representation of the route fragmented into a series of moves. Each of the maneuvers in the list of maneuvers may correspond to a respective one of the series of moves. An upcoming maneuver may correspond to the move to be taken upon commencement of the navigation operation. The upcoming maneuver may be the first move in the list of maneuvers or any intermediate move in the list of maneuvers. The following maneuver may be the move to be taken immediately after the upcoming maneuver. However, in some embodiments the following maneuver may be any of the next moves to be taken after the upcoming maneuver. In some example embodiments, the list of maneuvers may comprise at least the upcoming maneuver and the following maneuver.

In some example embodiments, a display unit associated with a navigation application may display all or part of the list of maneuvers in a sequential order. The sequential order may be a sequence in distance, time or any dimension suitable for displaying the maneuvers. At least the upcoming maneuver and the following maneuver may be displayed so as not to obscure the display unit. In some example embodiments, a countdown bar that indicates progress of the upcoming maneuver may be displayed as superimposed completely or partially on the upcoming maneuver. The progress of the upcoming maneuver may be indicated, for example, by the distance or time of travel remaining between the current location and an intermediate location corresponding to the upcoming maneuver. In some example embodiments, the upcoming maneuver may itself be displayed as including a countdown bar. For example, the upcoming maneuver may be displayed as a bar showing a distance of travel and a direction of making a turn. In some example embodiments, a visual indication corresponding to the degree of completion of the upcoming maneuver may be displayed along with the upcoming maneuver, as the countdown bar.

In some example embodiments, the display unit may be configured as a part of the vehicle so that the maneuvers are visible to the driver without compromising the driver's vision of the road ahead. For example, the graphical user interface or the display unit may be positioned such that when the driver is driving, the display unit is within the field of view of the driver. In some example embodiments, the maneuvers may be displayed close to the speedometer display area in the instrument cluster of the vehicle.

Figure 1:
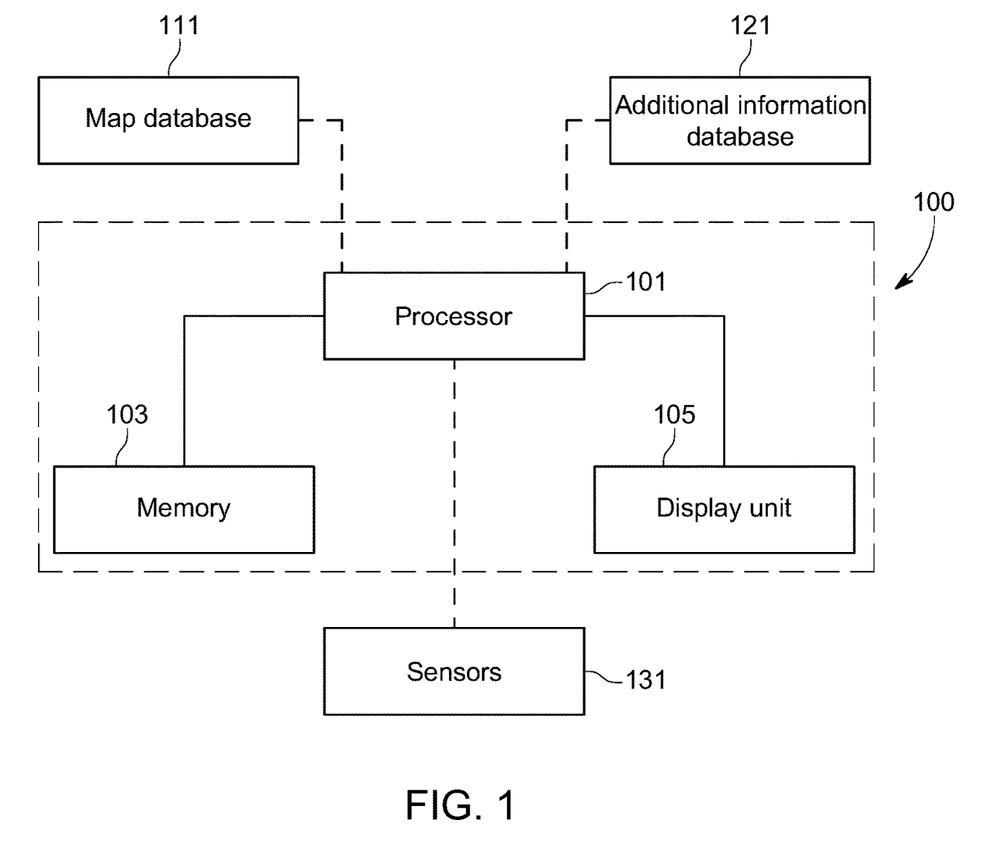
FIG. 1 illustrates a block diagram of a system for displaying navigation information for a route, in accordance with an example embodiment.

FIG. 1 illustrates a block diagram of a system 100 for displaying navigation information for a route in accordance with an example embodiment. The system 100 may be configured as a user equipment installed in a vehicle travelling along the route. In some example embodiments, the user equipment may be configured as a part of instrument cluster of the vehicle. Alternately, the system 100 may be configured as a user equipment in communication with control system of the vehicle. The user equipment may be a navigation system, such as an advanced driver assistance system (ADAS), a personal navigation device (PND), a portable navigation device, an infotainment system and/or other device that may be configured to provide route guidance and navigation related functions to the user of the vehicle. In some example embodiments, the user equipment may include a mobile computing device such as a laptop computer, tablet computer, mobile phone, smart phone, navigation unit, personal data assistant, watch, camera, or the like.

The system 100 may include a processor 101, a memory 103, and a display unit 105. In some example embodiments, the system 100 may be communicatively coupled with one or more databases. For example, as shown in FIG. 1, the processor 101 may be connected through a network to a map database 111 and an additional information database 121. The network may be wired, wireless, or any combination of wired and wireless communication networks, such as cellular, Wi-Fi, internet, local area networks, or the like.

The map database 111 may store node data, road segment data, link data, point of interest (POI) data, link identification information, heading value records or the like. The map database 111 may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 111 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 111 may also store data about the POIs and their respective locations in the POI records. The map database 111 may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 111 can include event data (e.g., traffic incidents, construction activities, scheduled events, unscheduled events, accidents, diversions etc.) associated with the POI data records or other records of the map database 111. A content provider e.g., a map developer may maintain the map database 111.

The additional information database 121 may store additional information associated with one or more POIs. For example, the additional information database 121 may store information regarding products, services, and other offerings associated with the one or more POIs. In some example embodiments the additional information may indicate offers, prices, menus, waiting time, and the like associated with the products, services, and offerings. Such additional information may be pre-stored or developed on a real time basis by various content providers and service providers.

In some example embodiments, the system 100 may be communicatively coupled to one or more sensors 131 of the vehicle. The one or more sensors 131 may be configured to capture data of the vehicle and/or the route. In some example embodiments, the one or more sensors 131 may include position sensors, such as the GPS sensor, motion sensor such as accelerometer, image sensor such as a camera and the like. In some example embodiments, the one or more sensors 131 may capture vehicle data such as but not limited to location of the vehicle, speed, acceleration, heading direction of the vehicle, fuel data, engine temperature, battery level, and the like and route data such as but not limited to road sign data, ground truth data, and the like. In some example embodiments, the one or more sensors 131 may capture the data in real-time or by using batch processing depending upon the type of OEM sensor installed in the vehicle.

The processor 101 may be embodied in a number of different ways. For example, the processor 101 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 101 may include one or more processing cores configured to perform independently. A multi-core processor may enable multiprocessing within a single physical package. Additionally, or alternatively, the processor 101 may include one or more processors configured in tandem via the bus to enable independent execution of instructions, pipelining and/or multithreading.

The memory 103 may be non-transitory and may include, for example, one or more volatile and/or non-volatile memories. For example, the memory 103 may be an electronic storage device (for example, a computer readable storage medium) comprising gates configured to store data (for example, bits) that may be retrievable by a machine (for example, a computing device like the processor 101). The memory 103 may be configured to store information, data, content, applications, instructions, or the like, for enabling the apparatus to carry out various functions in accordance with an example embodiment of the present invention. For example, the memory 103 could be configured to buffer input data for processing by the processor 101. Additionally, or alternatively, the memory 103 could be configured to store instructions for execution by the processor 101.

The processor 101 (and/or co-processors or any other processing circuitry assisting or otherwise associated with the processor 101) may be in communication with the memory 103 via a bus for passing information among components of the system 100. The processor 101 may be configured to execute instructions stored in the memory 103 or otherwise accessible to the processor 101. Additionally, or alternatively, the processor 101 may be configured to execute hard coded functionality. As such, whether configured by hardware or software methods, or by a combination thereof, the processor 101 may represent an entity (for example, physically embodied in circuitry) capable of performing operations according to an embodiment of the present invention while configured accordingly. Thus, for example, when the processor 101 is embodied as an ASIC, FPGA or the like, the processor 101 may be specifically configured hardware for conducting the operations described herein. Alternatively, as another example, when the processor 101 is embodied as an executor of software instructions, the instructions may specifically configure the processor 101 to perform the algorithms and/or operations described herein when the instructions are executed. However, in some cases, the processor 101 may be a processor specific device (for example, a mobile terminal or a fixed computing device) configured to employ an embodiment of the present invention by further configuration of the processor 101 by instructions for performing the algorithms and/or operations described herein. The processor 101 may include, among other things, a clock, an arithmetic logic unit (ALU) and logic gates configured to support operation of the system 100.

The processor 101 may supply display data to the display unit 105 using any suitable technique. The display unit 105 may be a liquid crystal display (LCD) panel, OLED panel, a video monitor, or any other visual display device capable of displaying a map and other graphical representations to a user that are described herein. In one example, the display unit 105 may be capable of receiving a user selection of one or more graphical representations displayed thereon. For example, the display unit 105 may receive a user input such as an input gesture, touch, and the like corresponding to selection of the one or more graphical representations. For this purpose, the display unit 105 may be a touchscreen display. In some example embodiments the display unit 105 may comprise the instrument cluster display of the vehicle. For this purpose, the display unit 105 may be configured to display for example speed, torque, fuel indication, battery indication, and the like along with the navigation information. In some embodiments the display unit 105 may be a part of the instrument cluster display of the vehicle. Accordingly, the display unit 105 may be configured to display navigation information and additional information. In other embodiments, the display unit 105 may be separate from the instrument cluster of the vehicle and may be integrated with any other part of the vehicle such that it is positioned within the field of view of the driver of the vehicle.

In some example embodiments, a traveler of the vehicle may request navigation assistance to a destination location. The processor 101 may communicate with the map database 111 to obtain map data corresponding to the route to the destination location. In some example embodiments, the map data may comprise a list of maneuvers to be traversed to reach the destination location. For example, the list of maneuvers may comprise at least an upcoming maneuver and a following maneuver. The processor 101 may further control the display unit 105 to display the maneuvers in an intuitive manner as is discussed herein.

Figure 2A:
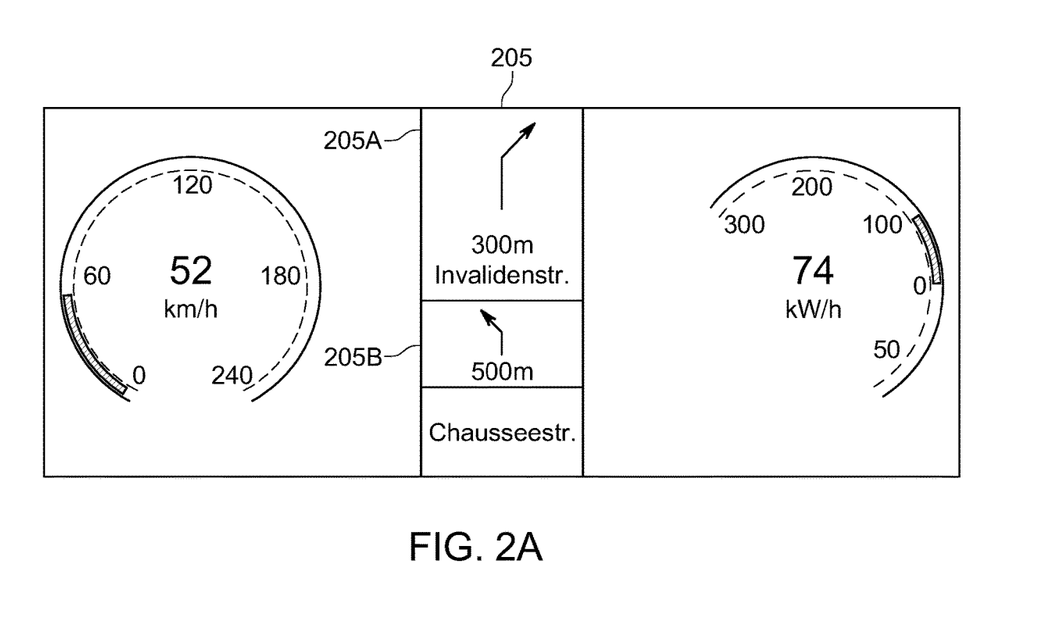
FIG. 2A illustrates an exemplary diagram showing a display unit for displaying the navigation information, in accordance with an example embodiment.
Figure 2B:
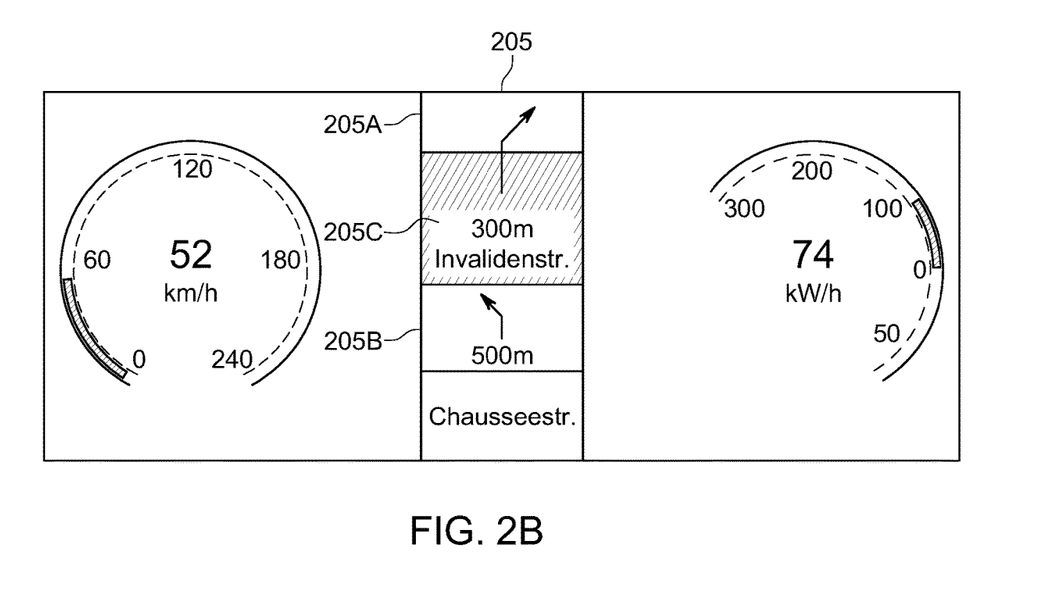
FIG. 2B illustrates an exemplary diagram showing a display unit for displaying a countdown bar integrated with display of upcoming maneuver on the display unit, in accordance with an example embodiment.
Figure 2C:
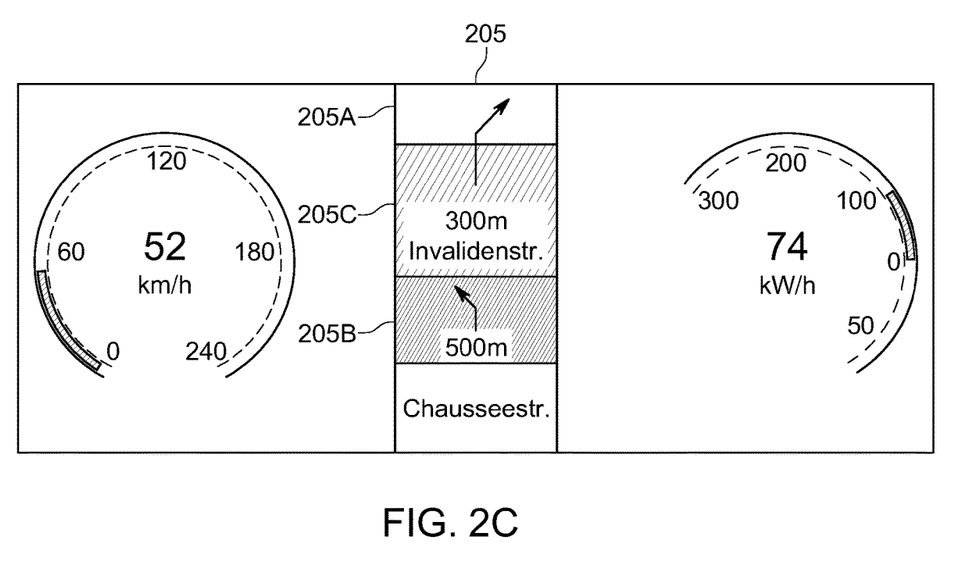
FIG. 2C illustrates an exemplary diagram showing display of visual indications to display the navigation information, in accordance with an example embodiment.

In some example embodiments, the processor 101 may control the display of maneuvers in a manner shown in FIG. 2A-2C.

FIG. 2A illustrates an exemplary diagram showing a display unit 205 for displaying the navigation information in accordance with an example embodiment. The display unit 205 may take the form of a display bar comprising a first part and a second part. The upcoming maneuver 205A in the list of maneuvers may be displayed in the first part while the following maneuver 205B may be displayed immediately below the upcoming maneuver 205A in the second part. In some example embodiments, the location at which the last/previous maneuver in the list of maneuvers was undertaken may also be displayed below the following maneuver 205B. For example, as is shown in FIG. 2A, the location "Chausseestr." may be displayed to indicate the location at which the last/previous maneuver was undertaken. In some example embodiments, Chausseestr. may correspond to the current location of the traveler.

In some example embodiments, the first part of the display bar may display a distance of 300 m before making a turn and a direction of the turn to reach an intermediate location 'Invalidenstr.' corresponding to the upcoming maneuver 205A. The second part may display for example, a distance of 500 m and a corresponding direction of turn as the following maneuver 205B. In some example embodiments, the first part may only show the direction of turn to reach the destination, as the upcoming maneuver 205A. In some example embodiments, the directions may be displayed using arrows. In some example embodiments, in response to a user input received on the display unit 205, the processor 101 may control the display unit 205 to switch from the display of distance before making next turn to the display of time duration before making the next turn. In this manner, the list of maneuvers may be displayed as a coherent list without occluding the display unit 205. The traveler of the vehicle can thus easily refer to the display unit 205 and follow the navigation assistance.

FIG. 2B illustrates an exemplary diagram showing the display of a countdown bar 205C integrated with the display of the upcoming maneuver 205A on the display unit 205 of FIG. 2A in accordance with an example embodiment. The countdown bar 205C may have a static or dynamic shape of any of a rectangle, square, triangle, ellipse, quadrilateral, and the like. It is to be understood that for the purpose of the invention, the countdown bar 205C may have any geometrical shape, color, and appearance, as long as it is visually distinct from the upcoming maneuver 205A and/or the following maneuver 205B.

In some example embodiments, the display of the upcoming maneuver 205A may be dynamically updated based on the progress of the upcoming maneuver 205A. For example, the display of the first part of the display bar may be dynamically updated to reflect the distance remaining before making the next turn. The countdown bar 205C may indicate a graphical representation of the progress of the upcoming maneuver 205A. For example, the countdown bar 205C may be displayed as a dynamically changing bar (quadrilateral or parallelogram) superimposed on the upcoming maneuver 205A. In some example embodiments, the countdown bar 205C may indicate the distance of travel between the current location of the traveler and an intermediate location corresponding to the upcoming maneuver 205A. In some example embodiments, the first part may display, the direction of turn and the distance remaining to reach the intermediate location 'Invalidenstr.' (i.e. the distance of travel between the current location of the traveler and the intermediate location 'Invalidenstr.'), in the countdown bar 205C. One or more prominent features of the countdown bar 205C may be differentiated in the display unit 205 with respect to the upcoming maneuver 205A. For example, the countdown bar 205C may be displayed darker as compared to the upcoming maneuver 205A, as is shown in FIG. 2B. In some example embodiments, the countdown bar 205C may be displayed in a color different from that of the upcoming maneuver 205A. In some example embodiments, the countdown bar 205C may be superimposed on the upcoming maneuver 205A along the width side (i.e. width of the countdown bar 205C and the upcoming maneuver 205A may be same) as is shown in FIG. 2B.

In some example embodiments, the countdown bar 205C may be displayed in a manner different from the upcoming maneuver 205A as well as the following maneuver 205B, as is shown in FIG. 2C. For example, the countdown bar 205C may be displayed in a color different from the upcoming maneuver 205A and the following maneuver 205B so that the countdown bar 205C is visually perceivable to the traveler. In some example embodiments, the display of the countdown bar 205C may be dynamically updated based on speed data obtained from the one or more sensors 131. For example, the display of the countdown bar 205C (and thus the display unit itself) may be updated based on the distance of travel between the current location of the traveler and an intermediate location corresponding to the upcoming maneuver 205A. In some example embodiments, the dynamic update of the countdown bar 205C may be shown as a visual indication of filling up of the countdown bar 205C. In some example embodiments, the countdown bar 205C may be displayed as growing in height to reflect the dynamic update of the countdown bar 205C. In some example embodiments, the intermediate location may correspond to the location at which the turn corresponding to the upcoming maneuver 205A is to be made. For example, as is shown in FIG. 2C, the intermediate location may be "Invalidenstr." which is shown as 300 m from the current location.

In some example embodiments, the upcoming maneuver 205A and the following maneuver 205B may be displayed as a part of a display bar on the display unit 205. The display bar may extend to cover a part of or the entire surface of the display unit 205 (and accordingly has not been shown). The display bar may display at least the upcoming maneuver 205A and the following maneuver 205B. In some example embodiments, the processor 101 may control the display unit 205 to display the upcoming maneuver 205A as a first part of the display bar and the following maneuver 205B as a second part of the display bar. For example, with reference to FIG. 2C, the countdown bar 205C may be superimposed on the upcoming maneuver 205A. In such cases, the rectangle (corresponding to 205A) that has the sparsely shaded rectangle (corresponding to 205C) superimposed on it and displays "300 m Invalidenstr." together with a first arrow pointing towards north-east, may correspond to the first part of the display bar. Similarly, the rectangle (corresponding to 205B) that displays "500 m" together with a second arrow pointing towards north-west and is shaded densely, may correspond to the second part of the display bar. The first arrow may correspond to the upcoming maneuver 205A and the second arrow may correspond to the following maneuver 205B. In some example embodiments, the first part may comprise bulk of the display bar. For example, the first part may comprise 80% of the display bar and the second part may comprise 20% of the display bar. It may be understood by a person of ordinary skill in the art that the ratios of 80% and 20% are for exemplary purpose only, and are by no means intended to limit the scope of the invention. In some other embodiments of the present invention, any other ratio between the sizes of the first part and the second part (for example, but not limited to 60%:40%, 70%:30% and the like) may be possible within the scope of the invention.

In some example embodiments, the display unit 205 may be dynamically updated based on the distance of travel between the current location and the intermediate location.

Figure 3:
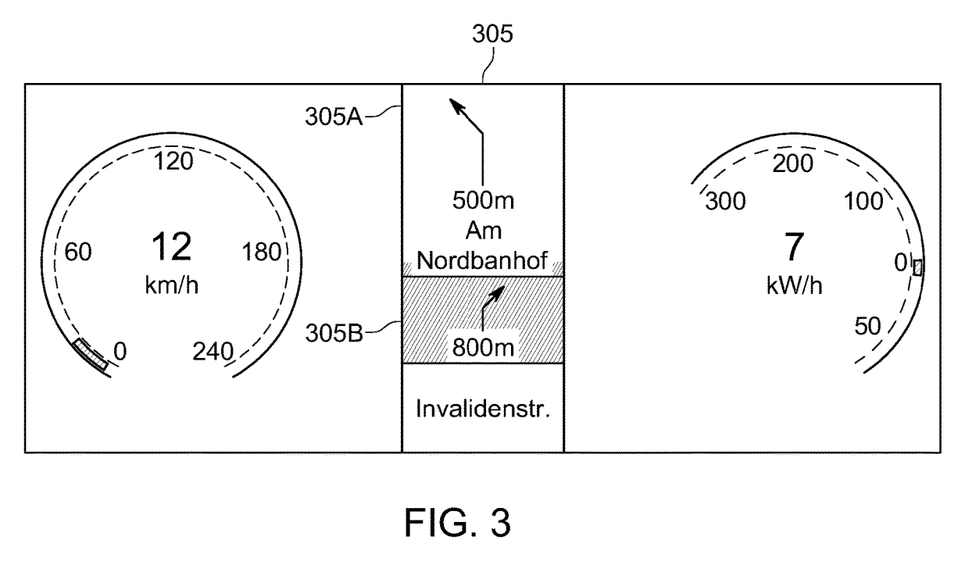
FIG. 3 illustrates an exemplary diagram showing update of the display of navigation information on the display unit, according to an example embodiment.

FIG. 3 illustrates an exemplary diagram showing update of the display of navigation information on the display unit 305 according to an example embodiment. Upon completion of the upcoming maneuver (i.e. the corresponding turn at intermediate location 'Invalidenstr.' taken), the display unit 305 may be updated. For example, the turn (500 m) that was indicated in the second part of the display bar as the following maneuver 205B of FIG. 2C, is shifted to the first part of the display bar as the upcoming maneuver 305A in FIG. 3, upon completion of the previously indicated upcoming maneuver 205A of FIG. 2C. Also, the location corresponding to the upcoming maneuver 305A, "Am Nordbanhof", now becomes the intermediate location. Correspondingly, the following maneuver 305B is also updated with the subsequent maneuver ('800 m') in the list of maneuvers as is shown in FIG. 3. In some example embodiments, upon completion of the upcoming maneuver 205A, the upcoming maneuver 205A becomes the last maneuver that was undertaken, for the system 100. Accordingly, the location (displayed below the following maneuver 305B in FIG. 3) that indicates the location at which the last/previous maneuver was undertaken is updated from "Chausseestr." of FIG. 2C to "Invalidenstr." in FIG. 3.

In some example embodiments, the display unit 305 may also be configured to display additional information related to the navigation information. The trigger to display the additional information on the display unit 305 may be automated or manual. For example, the processor 101 may determine one or more points of interest (POIs) along the route and in response, control the display unit 305 to display the additional information. In some example embodiments, the processor 101 may receive a user input through the display unit 305 and may trigger the display of additional information in response thereto.

FIGS. 4A-4D illustrate exemplary diagrams illustrating display of additional information in the navigation information according to an example embodiment. In some example embodiments, the display unit 405 may be customized to a specific POI. Such customization of the display unit 405 may be automated or through manual input. For example, the display unit 405 may be configured to receive a user input from the traveler to request customization/display of additional information. In some example embodiments, the user input may be any of an input gesture, a tap, touch, scroll, swipe, drag and the like.

In some example embodiments, the processor 101 may determine one or more points of interest (POIs) along the route to the destination. The processor 101 may obtain the information regarding the one or more POIs along with the list of maneuvers from the map database 111. In some example embodiments, the one or more POIs may be associated with a product/service brand. The processor 101 may further communicate with the additional information database 121 to obtain additional information associated with the one or more POIs.

Figure 4A:
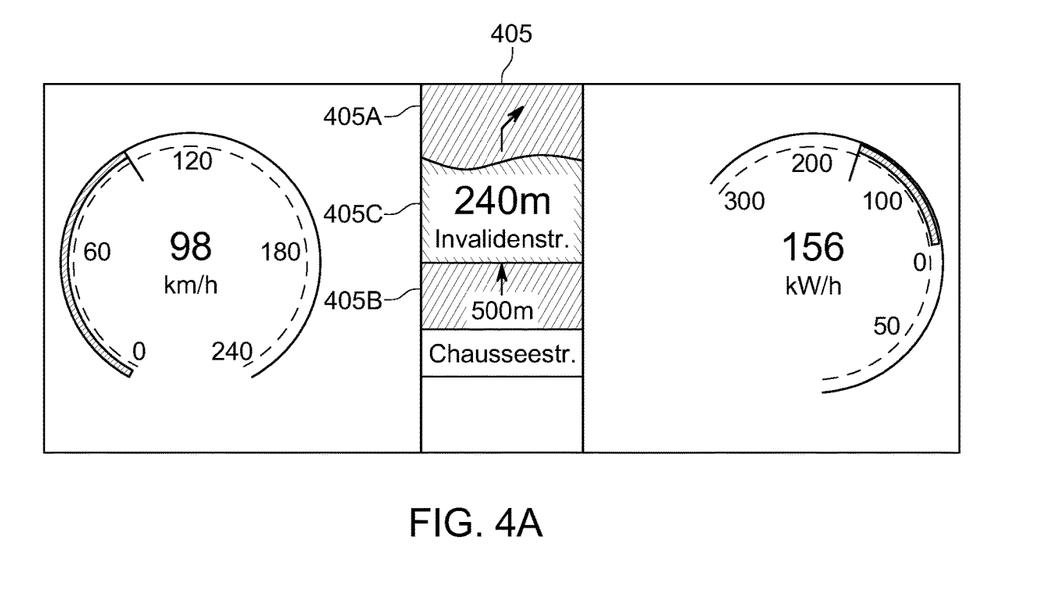
FIGS. 4A-4D illustrate exemplary diagrams illustrating display of additional information in the navigation information, according to an example embodiment.

FIG. 4A illustrates the display unit 405 customized for a specific product brand. In some example embodiments, one or more content displayed in the display unit 405 may be customized specific to the product/service brand. For example, the product/service brand may be associated with ABC coffee and an outlet of ABC coffee may fall on the route of travel of the vehicle while traversing the upcoming maneuver 405A. The processor 101 may communicate with the additional information database 121 to obtain additional information corresponding to ABC coffee. In some example embodiments, the additional information may be the information corresponding to the logo of ABC coffee. The processor 101 may further control the display unit 405 to display the upcoming maneuver 405A, the following maneuver 405B, and the countdown bar 405C to reflect the appearance of the logo of ABC coffee. In some example embodiments, the color of the countdown bar 405C may be changed to reflect the product of ABC coffee. In some example embodiments, the shape of the notch of the countdown bar 405C may be customized to reflect a characteristic element associated with the product of brand ABC coffee. For example, as shown in FIG. 4A, the color of the countdown bar 405C and the shape of the notch of the countdown bar 405C may be customized to be that of a coffee wave.

Figure 4B:
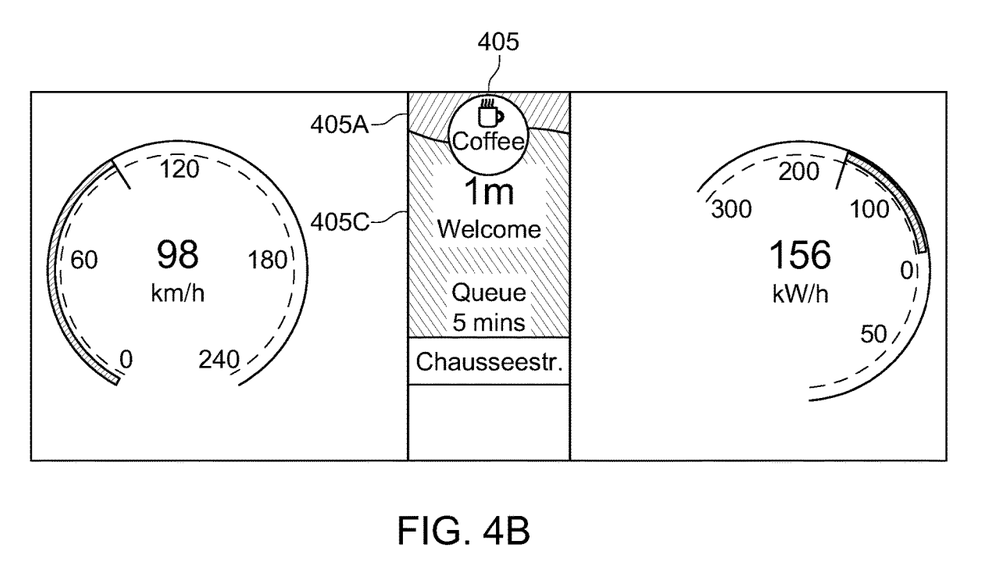

Additionally, in some example embodiments, the display unit 405 may be customized to reflect the logo of ABC coffee. For example, as shown in FIG. 4B, while traversing the upcoming maneuver 405A, when the traveler happens to reach substantially close to the POI associated with ABC coffee along the route, the processor 101 may control the display unit 405 to display waiting time associated with the POI of ABC coffee. For example, the processor 101 may control the display unit 405 to display the logo of the brand ABC coffee along with a welcome message in the countdown bar 405C when the traveler happens to approach the POI of ABC coffee.

Figure 4C:
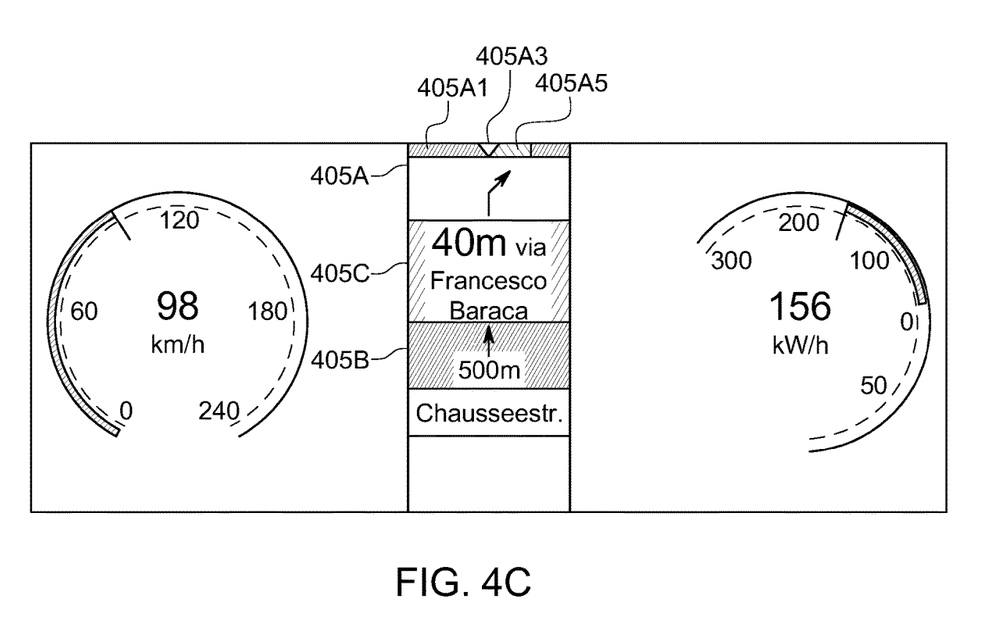

FIG. 4C illustrates the display unit 405 customized to display compass integration information along with the navigation information. In some example embodiments, the compass integration information may be displayed along with the upcoming maneuver 405A, the following maneuver 405B, and the countdown bar 405C.

In some example embodiments, a curve or a turn may have to be traversed as a part of the navigation assistance. In such circumstances, it becomes important to graphically define the curve or the turn in the navigation assistance. In some example embodiments, in order to provide better visual perception, the turn by turn maneuver may be combined with a compass. For example, as shown in FIG. 4C, the first part of the display bar that displays the upcoming maneuver 405A, may be customized to display a horizontal compass bar 405A1 at the top. In the middle of the horizontal compass bar 405A1, the current position of the traveler may be indicated by a current position indicator 405A3. Further, a maneuver bar 405A5 which is shown as beginning on the current position indicator 405A3 and ending at a target position indicator (not shown) may be displayed. In some example embodiments, based on the progress of the upcoming maneuver 405A, the length of the maneuver bar 405A5 may decrease to reflect the decrease in distance of travel between the current position and the target position. In this way, the traveler may be effectively guided regarding the upcoming maneuver 405A. Further, in some example embodiments, the traveler's orientation in a 360 degrees coordinate system may also be displayed below the horizontal compass bar 405A1.

Figure 4D:
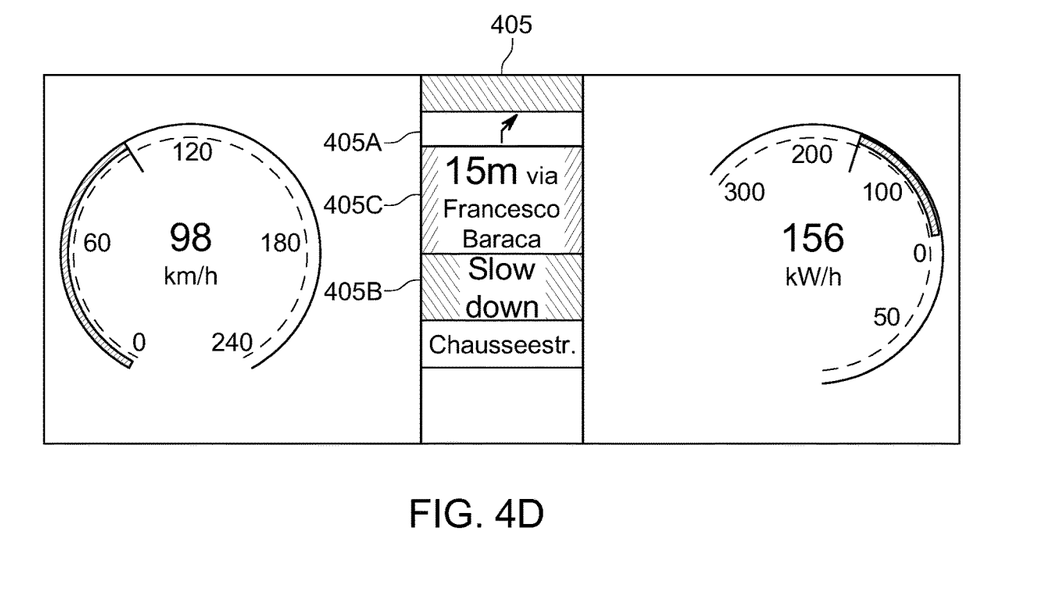

FIG. 4D illustrates an exemplary diagram showing display of notifications as additional information. In some example embodiments, the display unit 405 may be customized to display additional information related to an eco-driving mode related notification along with the upcoming maneuver 405A, the following maneuver 405B, and the countdown bar 405C. For example, while traversing the upcoming maneuver, the distance remaining before making a turn, may approach a value that is below a threshold distance, for example 90 m. The processor 101 may communicate with the one or more sensors 131 to obtain speed data of the traveler and may determine that the speed of the traveler is more than a threshold speed corresponding to the distance remaining before making the turn. In such scenarios, the processor 101 may further control the display unit 405 to display a notification that it is too fast to turn safely. In some example embodiments, the upper area of the first part of the display bar may change color based on decrease in the remaining distance and based on the speed of the traveler being more than the permissible threshold speed. For example, as is shown in FIG. 4D, the upper area of the first part (shown as shaded) may change its color from blue to red in relation to the current speed, blue indicating normal/safe driving and red indicating dangerous driving. In some example embodiments, a warning message may start flashing upon determining that the speed of the traveler is more than a threshold speed corresponding to the distance remaining before making a turn. The warning message may be displayed, for example, on the second part of the display bar that displays the following maneuver 405B, as is shown in FIG. 4D. In this way, navigation assistance may be provided in an intuitive and ordered manner.

In some example embodiments, the display unit 405 may be customized to display notifications regarding economical driving, also referred to herein as eco-driving. For example, the processor 101 may communicate with the one or more sensors 131 to obtain data regarding acceleration and braking. The processor 101 may further determine whether the traveler drives economically based on the obtained data and the upcoming maneuver 405A. The processor 101 may fetch optimum driving data and compare the acceleration data with the optimum driving data to determine whether the traveler is driving economically. Accordingly, the processor 101 may be configured to control the display unit 405 to display notification messages to slow down if the traveler is driving too fast. Such a notification may also be provided through colors, for example, the color of the upper area of the first part of the display bar may change in response to the driving conditions determined by the processor 101. In some example embodiments, the color of the upper area may not change if the traveler continues to drive in economy mode. Various other modes of notification may be possible within the scope of the invention.

Figure 5:
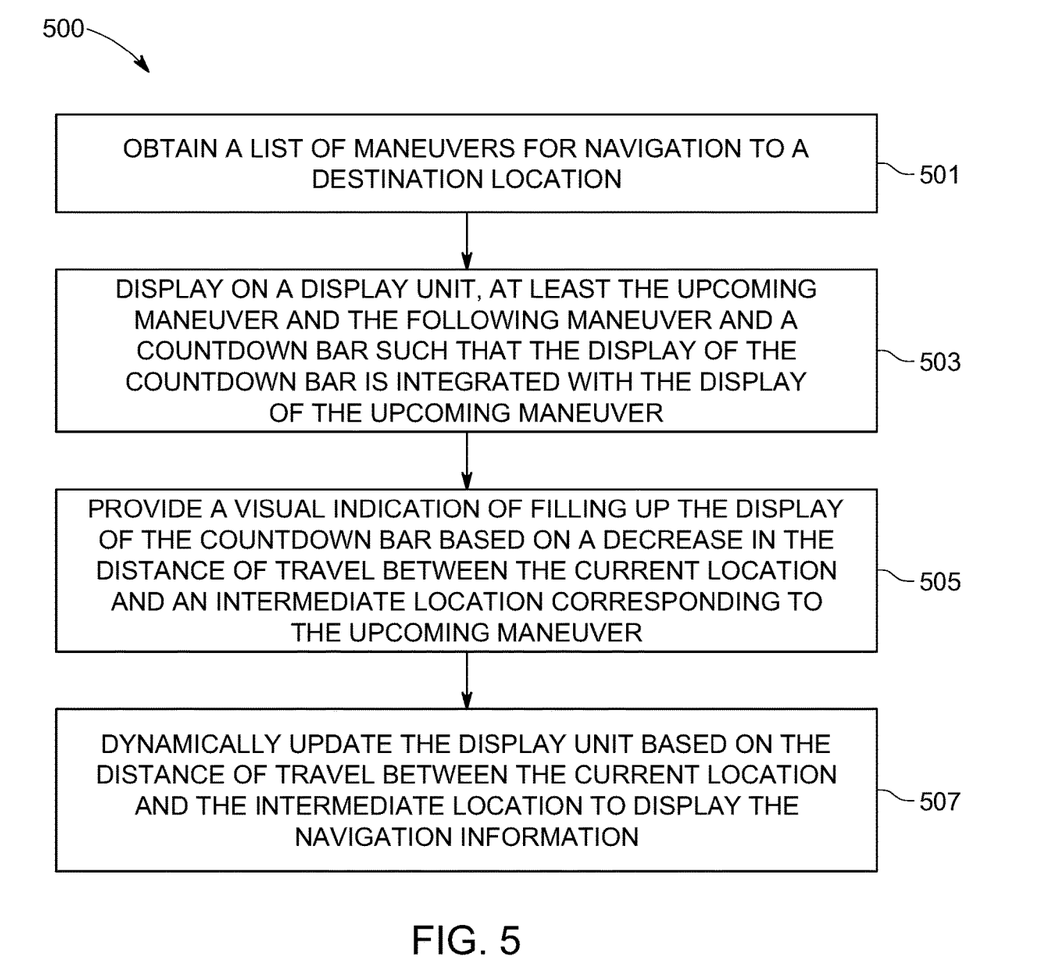
FIG. 5 illustrates a flow diagram of a method for displaying navigation information for a route, in accordance with an example embodiment.

FIG. 5 illustrates a flow diagram of a method 500 for displaying navigation information for a route according to an example embodiment.

The method 500 may include, at 501, obtaining a list of maneuvers for navigation to a destination location on the route. The list of maneuvers may include at least an upcoming maneuver and a following maneuver. The list of maneuvers may be obtained by communicating with the map database 111 discussed in conjunction with FIG. 1. Further, once the list of maneuvers has been received, the method 500 may include, at 503, displaying on a display unit, at least the upcoming maneuver and the following maneuver and a countdown bar. The displaying may be in such a manner that the display of the countdown bar is integrated with the display of the upcoming maneuver. The countdown bar may indicate a distance of travel between a current location and an intermediate location corresponding to the upcoming maneuver. Alternately, the countdown bar may indicate a time of travel between the current location and the intermediate location corresponding to the upcoming maneuver. Among the maneuvers of the list of maneuvers, at least the upcoming maneuver and the following maneuver may be displayed so as not to obscure the display unit. The upcoming maneuver, the following maneuver, and the countdown bar may be displayed in any of the ways discussed in conjunction with FIG. 2A-2C.

The method 500 may further include at 505, providing a visual indication of filling up of the display of the countdown bar based on a decrease in the distance or time of travel between the current location and the intermediate location corresponding to the upcoming maneuver. The visual indication may include a dynamically enlarging progress bar that may be displayed superimposed on the upcoming maneuver in the manner shown in FIG. 2B. The method 500 may further include at 507, dynamically updating the display unit based on the distance of travel between the current location and the intermediate location to display the navigation information.

The method 500 may be implemented using corresponding circuitry. For example, the method 500 may be implemented by an apparatus or system comprising a processor, a memory, and a display unit of the kind discussed in conjunction with FIG. 1.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g. the processor 101) configured to perform some or each of the operations of the method of FIG. 5 described previously. The processor may, for example, be configured to perform the operations (501-507) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-507) may comprise, for example, the processor 101 which may be implemented in the system 100 and/or a device or circuit for executing instructions or executing an algorithm for processing information as described above.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for displaying navigation information of a route, the method comprising:
    obtaining a list of maneuvers for navigation to a destination location on the route, wherein the list of maneuvers comprises at least an upcoming maneuver and a following maneuver;
    displaying by a display unit, at least the upcoming maneuver and the following maneuver and a countdown bar such that the display of the countdown bar is integrated with the display of the upcoming maneuver, wherein the countdown bar provides a graphical representation that indicates a distance of travel between a current location and an intermediate location corresponding to the upcoming maneuver; and
    dynamically updating the display unit based on the distance of travel between the current location and the intermediate location to display the navigation information, wherein dynamically updating the display unit comprises dynamically changing the graphical representation of the countdown bar to represent changes in the distance of travel between the current location and the intermediate location corresponding to the upcoming maneuver, and wherein dynamically updating the display unit further comprises providing a visual indication of filling up or growing the display of the countdown bar in advance of reaching the intermediate location based on a decrease in the distance of travel between the current location and the intermediate location corresponding to the upcoming maneuver.

2. The method of claim 1, further comprising displaying by the display unit, information corresponding to a product brand.

3. The method of claim 2, wherein the product brand is associated with a retail store in vicinity of the intermediate location corresponding to the upcoming maneuver.

4. The method of claim 1, further comprising displaying by the display unit, a time of travel between the current location and the intermediate location corresponding to the upcoming maneuver.

5. The method of claim 1, further comprising displaying by an interactive interface of the display unit, additional information related to the list of maneuvers, based on an input gesture.

6. The method of claim 5, wherein the input gesture comprises a tap input on the interactive interface.

7. The method of claim 1, further comprising displaying by the display unit, a visual indication of a notification, wherein the visual indication comprises a plurality of colors.

8. A system for displaying navigation information for a route, the system comprising:
    at least one display unit;

at least one memory configured to store instructions; and at least one processor configured to execute the instructions to:

obtain a list of maneuvers for navigation to a destination location on the route, wherein the list of maneuvers comprises at least an upcoming maneuver and a following maneuver;

control the display unit to display at least the upcoming maneuver and the following maneuver and a countdown bar such that the display of the countdown bar is integrated with the display of the upcoming maneuver, wherein the countdown bar provides a graphical representation that indicates a distance of travel between a current location and an intermediate location corresponding to the upcoming maneuver; and dynamically update the display unit, based on the distance of travel between the current location and the intermediate location to display the navigation information, wherein the display unit is dynamically updated by dynamically changing the graphical representation of the countdown bar to represent changes in the distance of travel between the current location and the intermediate location corresponding to the upcoming maneuver, and wherein the display unit is dynamically updated by providing a visual indication of filling up or growing the display of the countdown bar in advance of reaching the intermediate location based on a decrease in the distance of travel between the current location and the intermediate location corresponding to the upcoming maneuver.

9. The system of claim 8, wherein the processor is further configured to control the at least one display unit to display information corresponding to a product brand.

10. The system of claim 9, wherein the product brand is associated with a retail store in vicinity of the intermediate location corresponding to the upcoming maneuver.

11. The system of claim 8, wherein the processor is further configured to control the at least one display unit to display a time of travel between the current location and the intermediate location corresponding to the upcoming maneuver.

12. The system of claim 8, wherein the processor is further configured to control an interactive interface of the at least one display unit to display additional information related to the list of maneuvers based on an input gesture.

13. The system of claim 12, wherein the input gesture comprises a tap input on the interactive interface.

14. The system of claim 8, wherein the processor is further configured to control the at least one display unit to display a visual indication of a notification, wherein the visual indication comprises a plurality of colors.

15. The system of claim 8, wherein the processor is further configured to:

control the at least one display unit to display the upcoming maneuver as a first part of a display bar and the following maneuver as a second part of the display bar, wherein the first part comprises about 80% of the display bar and the second part comprises about 20% of the display bar; and dynamically update the display of the first part of the display bar, such that the display of the following maneuver is shifted from the second part of the display bar to the first part of the display bar, based on the distance of travel between the current location and the intermediate location becoming zero.

16. The system of claim 15, wherein the processor is further configured to control the at least one display unit to display at least a first arrow in the first part of the display bar and at least a second arrow in the second part of the display bar, wherein the at least first arrow corresponds to the upcoming maneuver and the at least second arrow corresponds to the following maneuver.

17. A non-transitory computer-readable medium having stored thereon, computer-executable instructions which when executed by a computer, cause the computer to carry out operations for displaying navigation information of a route, the operations comprising:

obtaining a list of maneuvers for navigation to a destination location on the route, wherein the list of maneuvers comprises at least an upcoming maneuver and a following maneuver;

displaying by a display unit, at least the upcoming maneuver and the following maneuver and a countdown bar such that the display of the countdown bar is integrated with the display of the upcoming maneuver, wherein the countdown bar provides a graphical representation that indicates a distance of travel between a current location and an intermediate location corresponding to the upcoming maneuver; and dynamically updating the display unit, based on the distance of travel between the current location and the intermediate location to display the navigation information, wherein dynamically updating the display unit comprises dynamically changing the graphical representation of the countdown bar to represent changes in the distance of travel between the current location and the intermediate location corresponding to the upcoming maneuver, and wherein dynamically updating the display unit further comprises providing a visual indication of filling up or growing the display of the countdown bar in advance of reaching the intermediate location based on a decrease in the distance of travel between the current location and the intermediate location corresponding to the upcoming maneuver.

* * * * *